Sept. 10, 1929.  E. E. WEMP  1,727,577
TRANSMISSION
Filed Dec. 22, 1927  2 Sheets-Sheet 1

INVENTOR.
Ernest E. Wemp
BY
Stuart C. Barnes
ATTORNEY

Sept. 10, 1929.  E. E. WEMP  1,727,577
TRANSMISSION
Filed Dec. 22, 1927   2 Sheets-Sheet 2

INVENTOR.
Ernest E. Wemp
BY Stuart C Barnes
ATTORNEY.

Patented Sept. 10, 1929.

1,727,577

UNITED STATES PATENT OFFICE.

ERNEST E. WEMP, OF DETROIT, MICHIGAN.

TRANSMISSION.

Application filed December 22, 1927. Serial No. 241,803.

This invention relates to transmissions. It is the object of the invention to provide a transmission in which the gears may be shifted, with one exception, without releasing the clutch. A further object of the invention is to afford a vibration eliminator that prevents the vibration from being transmitted effectively to the countershaft of the transmission.

A further object of the invention is to supply an omission which necessarily occurs in the improvement described in my prior application executed November 23, 1927, Serial No. 237,642, filed December 5, 1927. I refer to the inability in my prior device to use the engine as a brake. In the design embodied in the present application it is possible to use the engine when in direct drive as a brake.

Referring to the drawings.

Figure 1:
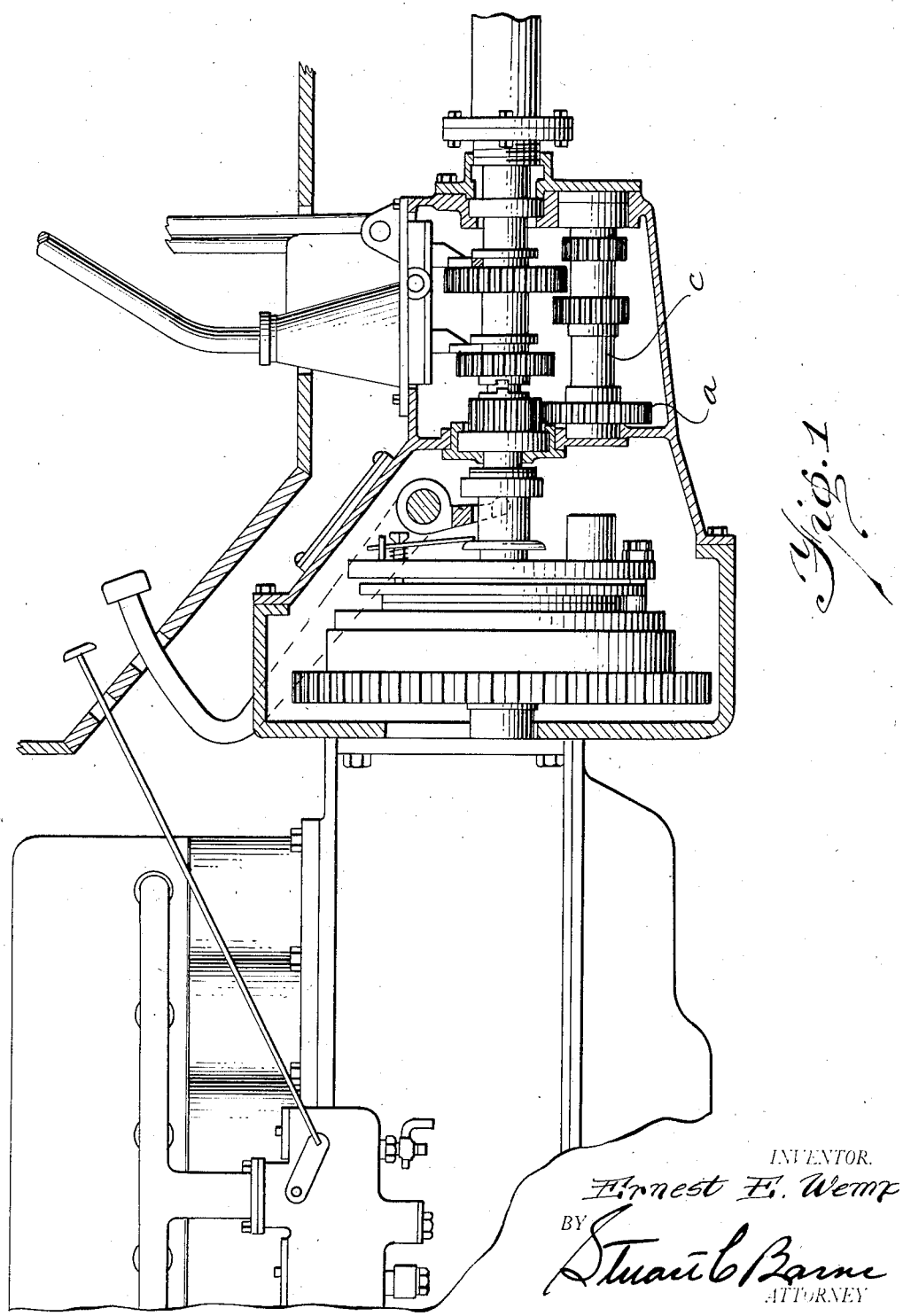
Fig. 1 is a longitudinal section of the transmission, including the clutch, and showing the power plant in fragmentary elevation.

In my above referred to prior application I have described and claimed broadly the use of an overrunning clutch in connection with the transmission to eliminate the necessity of shifting gears in passing from one speed ratio to another. In that application it is fully described how, by releasing the pressure of the foot on the accelerator, the driven parts are caused to overrun the drive parts, and consequently while this occurs there is a complete disconnection between the two. This can be used in place of throwing out the clutch in shifting from one gear ratio to another in going up from low to high speed. In coming down, the same way of disconnecting the parts is effected by releasing the pressure on the accelerator. However, before the gear is shifted to the next gear in coming down from high to lower gear ratio, it is necessary to speed up the gear to which the shift is to be made in order to try to synchronize the pitch line speed of the two gears that are to mesh. This can be done by again pressing on the accelerator just before the shift is to be made to the next gear, and after the gears have been released from their previous meshing condition.

In this prior application there is described how this enables the operation of a motor car without the use of a clutch, except in throwing in the load on the engine. This makes it much simpler to operate the car, for the control can be wholly effected by the one foot which is always used on the accelerator. Furthermore, it lessens the wear on the clutch very much, and does away with most of the slipping in and dragging action in clutching and releasing, which causes most of the wear on the facings of the clutch.

It is also described in the prior application how this type of overrunning clutch acts as a substitute for vibration dampeners, by converting all the vibrations into a uni-directional force,—that is, the periodic vibrations of the motor shafts are only effective in one direction of the torque as the clutch releases each vibration in the opposite direction. The consequence is that their disturbing features are largely eliminated.

However, one consequence of embodying an overrunning clutch as described and claimed in my prior application, where the overrunning clutch is located in the main clutch member, is that the engine can never be used for braking the momentum of the car. As soon as the momentum of the car is greater than the engine effort, the overrunning clutch disconnects the two parts. This is somewhat of a handicap in mountainous districts, where the engine is an important factor in checking the movement down steep grades. However, with the present system of four-wheel brakes in vogue, this is not as serious a difficulty as it would otherwise be.

It is the purpose of the present invention to secure operation of the car and shifting largely by control of the accelerator, but at the same time not to wholly dispense with the engine as a braking agency where needed. This can be accomplished by placing the overrunning clutch in the driven gear on the countershaft.

Figures 2, 3:
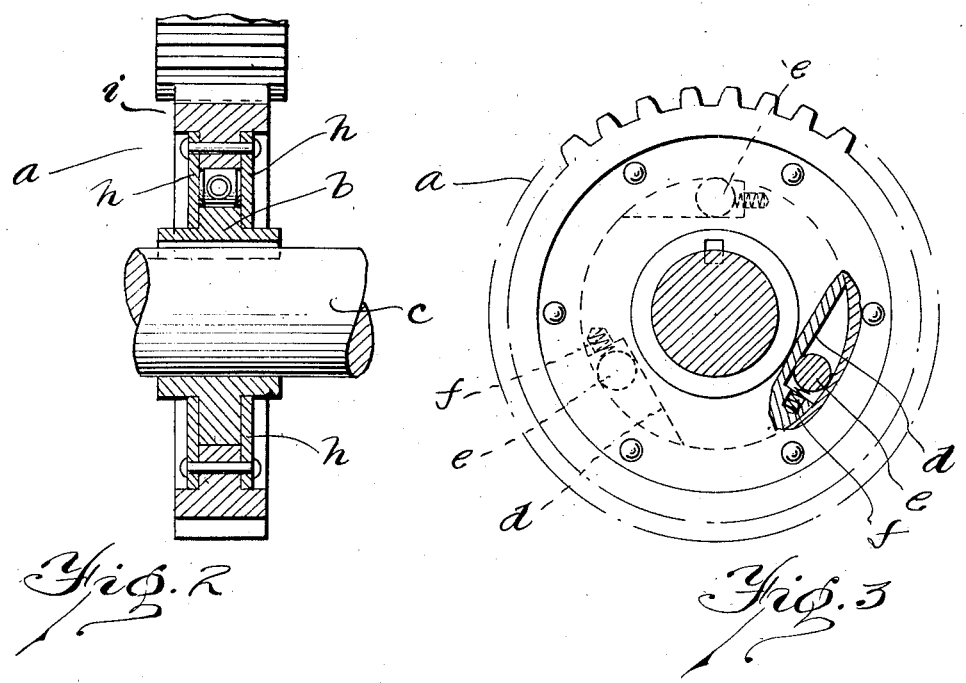
Fig. 2 is a cross section through the driven gear on the countershaft.
Fig. 3 is an elevation of this gear.
Figure 4:
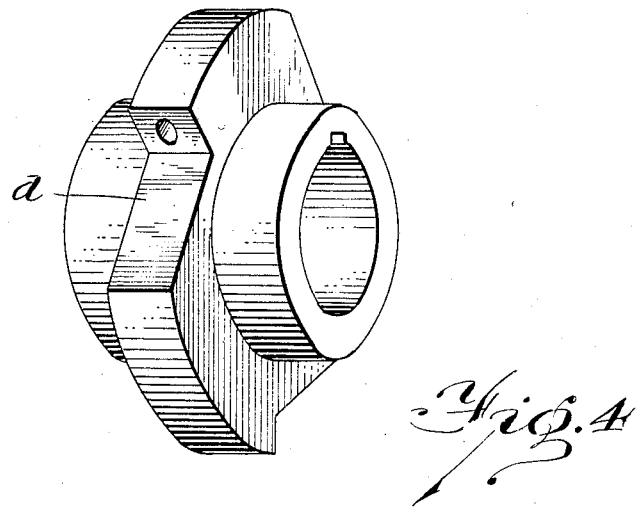
Fig. 4 is a perspective view of the hub of same.

Referring to Fig. 1, it will be unnecessary to detail the various parts of the motor, clutch and transmission. These will be perfectly apparent to anybody familiar with standard motor car construction. Suffice it to say that the countershaft driven gear *a* is not of the usual type, but is provided with the overrunning ball or roller clutch, as detailed in Figs. 2 and 3. A separate hub *b* is keyed to the countershaft *c*. This carries peripheral recesses *d* which engage rollers *e*, urged forward by the coil springs *f*. A pair of retaining rings *h* clamp the gear body *i* to the flange of the hub, and hold the rollers and springs in assembled relation. This constitutes one well known form of overrunning clutch. It will readily be understood that when the speed of the driving member of this clutch is greater than the driven member, the parts are locked together. On the other hand, when the speed of the driven member is for one reason or another increased over that of the driving member, the driven member can run away from the driving member and, to all intents and purposes declutch therefrom.

The results following this construction are distinguished from the placing of the overrunning clutch in the driven clutch plate hub, or for that matter, at other points in the direct transmission line in these particulars: When the motor is in direct drive or, in third speed, obviously there is an uninterrupted drive connection between the power plant and wheels of the vehicle. The result is that the third speed may be used as a brake on the motor in descending a hill or mountain. On the other hand, the periodic vibrations of the engine can be transmitted through the propeller shaft in a way not possible in the design described in my prior application. However, this present design will in a measure eliminate the most disturbing results of the transmission of these vibrations. These vibrations, by reason of the overrunning clutch, will be effective on the countershaft only unidirectionally. One of the disturbing features of the transmission of engine vibrations to the transmission is the clearance between the countershaft gear teeth and the main shaft gear teeth. With the countershaft provided with an overrunning clutch any vibrations that tend to rock the shaft in one direction have a negative effect as the clutch releases. On the other hand, vibrations that tend to rock the shaft in the other direction have a uni-directional impetus and consequently do not so seriously disturb the transmission.

The shifting of gears can be effected as described in my prior application and as epitomized above simply by control of the accelerator; except, however, when shifting down from third to second gear it will be necessary to throw out the main clutch for the reason that when in direct drive the overrunning clutch is not encompassed in the drive line.

Claims:
1. In a mechanical power transmission line, the combination of driving and driven members arranged for connection in various speed ratios, and including an overrunning clutch so arranged and located that on one speed arrangement of the gear the overrunning clutch is not effective and consequently the driving member can be used as a brake on the driven member.

2. In a mechanical power transmission line, the combination of a plurality of drive and driven members arranged to be brought into various relations of speed, and including an overrunning clutch so arranged that on direct drive the overrunning clutch is not effective on the power transmission line and consequently the driving member can be used as a brake on the driven member.

3. In a mechanical power transmission line, the combination of an engine, a transmission including sliding gears, and a countershaft, the gears being arranged for various speed relations, one of the countershaft gears being mounted on its shaft through the interposition of an overrunning clutch.

4. In a mechanical power transmission line, the combination of an engine, a transmission secured in operative relation with the engine and including a plurality of change speed gears in which are comprised also a countershaft and countershaft gears, one of the driven countershaft gears being mounted upon a shaft by means of an overrunning clutch.

5. In a mechanical power transmission line, the combination of a drive shaft, a driven shaft, a counter shaft, speed change gears associated with the driven shaft, speed change gears on the counter-shaft with which the first mentioned speed change gears are adapted to be meshed to effect various speed relations between the driving and driven shaft, a gear on the driving shaft, a gear on the counter-shaft which meshes with the gear on the driving shaft, and an over-running clutch disposed between the counter-shaft and the said last named gear thereon arranged to permit said counter-shaft to over-run the driving shaft.

In testimony whereof I have affixed my signature.

ERNEST E. WEMP.